E. FABER.
ERASER.
APPLICATION FILED JAN. 27, 1910.
1,067,012. Patented July 8, 1913.
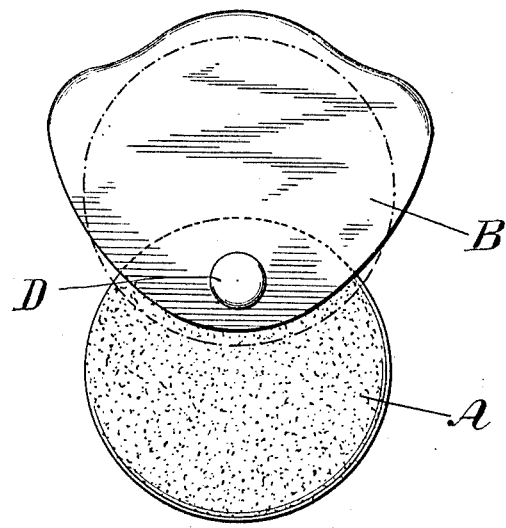
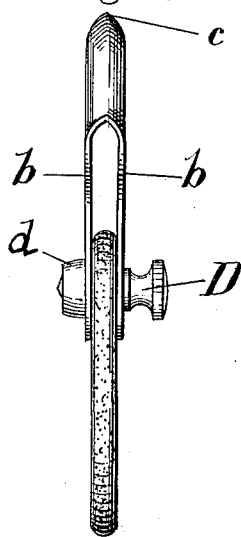
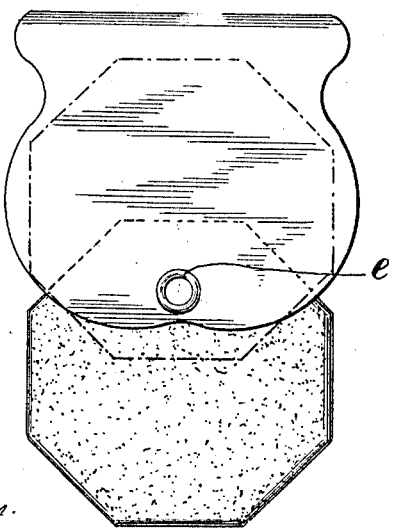
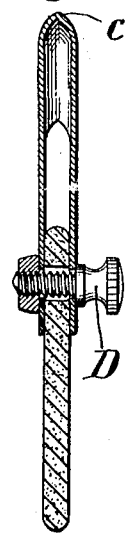

UNITED STATES PATENT OFFICE.

EBERHARD FABER, OF NEW YORK, N. Y., ASSIGNOR TO EBERHARD FABER PENCIL COMPANY, OF BROOKLYN, NEW YORK, A CORPORATION OF NEW JERSEY.

ERASER.

1,067,012. Specification of Letters Patent. Patented July 8, 1913.

Application filed January 27, 1910. Serial No. 540,311.

*To all whom it may concern:*

Be it known that I, EBERHARD FABER, a citizen of the United States, residing in the city of New York, county of Richmond, and State of New York, have invented certain new and useful Improvements in Erasers, of which the following is a specification.

This invention is directed to the provision of an improved form of rubber eraser of the type commonly used in erasing typewritten matter, having a thin piece of rubber the edge of which may be used to erase a single letter in a typewritten word.

The object of the invention is to provide an eraser of this character of an improved construction such that it may be firmly gripped in the hand in order to manipulate it effectively, that the thin rubber disk is strengthened against flexure and that a large part of the rubber may be protected from becoming soiled.

The invention involves the provision of an eraser consisting of a piece of rubber and a holder therefor in which the rubber is pivoted, this pivot being located eccentrically with respect to the rubber piece so that the latter may be turned relatively to the holder to a position in which a large portion thereof is exposed for use or to a position in which the major portion of the rubber is within the holder. Thus, when the eraser is not in use, the rubber thereof may be turned on its pivot so that a large portion thereof is protected from becoming soiled, but the usefulness of the eraser is in no way restricted for any portion of the rubber about the pivotal axis may be moved out from within the holder to permit of its use. The holder consists of two side-plates of thin sheet-metal lying on opposite sides of the rubber disk, these plates being united beyond the periphery of the disk a distance sufficient to permit the eccentrically-pivoted rubber to be moved within them. Preferably the two side-plates are integral, being formed from a single-piece of sheet-metal by folding the latter along the center line thereof. As thus constructed, the side-plates of the holder are of considerable area, so that when the rubber has been turned within them they protect a large portion of the rubber from being soiled; also, on account of the substantial size of the holder, the eraser may be firmly gripped in the hand, so that it can be used effectively; and furthermore, since the side-plates of the holder are thin and flexible, they will be pressed against the rubber in gripping the eraser and thus strengthen it against flexure during the erasing operation.

The preferred embodiment of the invention is illustrated in the accompanying drawings, in which—

Figure 1 is a front view of the eraser, Fig. 2 is a side view, Fig. 3 is a central vertical section, and Fig. 4 is a view similar to Fig. 1 illustrating a modification.

Referring to these drawings, A indicates the rubber portion of the eraser and B the holder therefor. The holder, as shown in the drawings, consists of a single piece of sheet-metal folded at the middle thereof, as indicated at $c$, to form side-plates $b\ b$ lying one on either side of the rubber A. The rubber A is pivotally mounted within the holder, the pivot being located eccentrically with respect to the rubber. Preferably the eccentricity is such that but a very small portion of the rubber extends beyond the edges of the holder when the parts are in the positions in which they are shown in Fig. 1, and the holder is made of such size that the portion of the rubber extending the maximum distance from the pivotal axis may be freely moved within the holder. In pivoting the rubber disk A in the holder B, I may employ a pivot-pin D, the threaded end of which passes through openings in the side-plates $b\ b$ and the disk A and enters a threaded opening in a nut $d$ secured to one of the side-plates as by brazing or soldering.

When it is desired to use the eraser, the disk A may be turned through half a revolution relatively to the holder so that the major portion of the disk is exposed. Or the eraser may be used in the condition in which it is shown in Fig. 1; when so used, the plates $b$ will be pressed against the disk A sufficiently tightly to prevent rotation thereof and the disk will be stiffened against flexure by the plates, and the extended area presented by the holder facilitates gripping the eraser firmly. When any part of the disk A becomes worn away, the disk may be rotated slightly on its pivot to bring another portion thereof into position for use. Furthermore, when the eraser is not in use, a large portion thereof will be protected from being soiled by the side-plates of the holder.

It will be apparent that the construction shown in Figs. 1, 2 and 3 may be varied in many respects, while still embodying my invention. For instance, in Fig. 4 I have shown a construction differing from that illustrated in the other figures in that the holder is differently shaped, the rubber is polygonal rather than circular, and the rubber is pivotally mounted in the holder in a different manner.

In the construction shown in Fig. 4, an eyelet $e$ is employed in place of the pivot-pin D, in which case the rubber will not be removable from the holder as is the case with the construction shown in the other figures.

Having now described my invention, what I claim as new therein and desire to secure by Letters Patent is as follows:—

An eraser comprising a holder consisting of a single piece of thin sheet-metal folded to form two parallel side-plates integrally connected at one edge, a pivot-pin having fixed position, the same passing through openings in said plates near the opposite edge thereof, and a disk of rubber between said plates having an opening therethrough located eccentrically with respect to the disk and through which said pin passes, said disk being rotatable about the pivot-pin to carry the portion thereof extending the greater distance from the pivotal axis within the holder and said plates being flexible so that in gripping the eraser for use the disk will be held against rotation, said holder being unbroken between its edges so as to continuously cover and protect the portion of said disk which is not in use.

This specification signed and witnessed this 25th day of January, 1910.

EBERHARD FABER.

Witnesses:
W. E. EDGERLEY,
FRANK BYLRS.

---

Copies of this patent may be obtained for five cents each, by addressing the "Commissioner of Patents, Washington, D. C."

It is hereby certified that the name of the State of incorporation of the assignee in Letters Patent No. 1,067,012, granted July 8, 1913, upon the application of Eberhard Faber, of New York, N. Y., for an improvement in "Erasers," was erroneously written and printed as "New Jersey" whereas it should have been written and printed as *New York;* and that the said Letters Patent should be read with this correction therein that the same may conform to the record of the case in the Patent Office.

Signed and sealed this 12th day of August, A. D., 1913.

[SEAL.]

E. B. MOORE,

*Commissioner of Patents.*